United States Patent
Oberthür

[15] 3,682,513
[45] Aug. 8, 1972

[54] ANTISKID BRAKE CONTROL

[72] Inventor: Heinrich Oberthür, Offenbach-Rumpenheim, Germany

[73] Assignee: ITT Industries, Inc., New York, N.Y.

[22] Filed: July 31, 1970

[21] Appl. No.: 59,974

[30] Foreign Application Priority Data

Aug. 7, 1969 Germany..........P 19 40 248.3

[52] U.S. Cl. ................303/21 F, 303/21 AF, 303/61
[51] Int. Cl. ..............................................B60t 8/02
[58] Field of Search .........188/181; 303/6 R, 6 C, 10, 303/21, 61–63, 68–69

[56] References Cited

UNITED STATES PATENTS

| | | |
|---|---|---|
| 3,497,269 | 2/1970 | Van Wicklin .............303/21 F |
| 3,514,161 | 5/1970 | Frayer......................303/21 F |
| 3,556,609 | 1/1971 | MacDuff............188/181 A X |
| 3,574,416 | 4/1971 | Skoyles ....................303/21 F |
| 3,498,683 | 3/1970 | Leiber................188/181 A X |
| 3,414,336 | 12/1968 | Atkin et al................303/21 F |
| 3,586,388 | 6/1971 | Stelzer......................303/21 F |
| 3,545,817 | 12/1970 | Yarber............303/21 BE UX |

Primary Examiner—Milton Buchler
Assistant Examiner—Stephen G. Kunin
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A road vehicle antiskid brake control having a separating valve for isolating the hydraulic brake line to the wheel and a pressure relief cylinder and piston connected to the brake line to increase the volume of the line and relieve the brake pressure when the separating valve is closed. The separating valve and pressure relief cylinder are interconnected hydraulically by a pair of two-position solenoid operated valves. The movement of the pressure relief piston is independent of the separating valve and is determined by the application of a controlled pressure differential across the piston.

8 Claims, 3 Drawing Figures

PATENTED AUG 8 1972 3,682,513

Inventor
HEINRICH OBERTHÜR
By Philip M. Bolton
Attorney

ANTISKID BRAKE CONTROL

BACKGROUND OF THE INVENTION

This invention relates to antiskid brake control systems for vehicles and particularly to systems of this type in which the hydraulic line to the wheel brake cylinder is isolated or cut off from the pressure source and the volume of the line increased to relieve the brake pressure in response to a signal indicating an incipient skidding of the wheel.

In a known antiskid system of this type the movement of the piston which affects the volume increase in the hydraulic line is mechanically coupled to the movement of the separating valve which isolates the brake line. The piston is moved by a controlled constant pressure differential which acts across the diaphragm attached to the piston and in opposition to the high preload of a spring which acts between the housing and the diaphragm and piston to return the piston to its rest position.

The high force necessary to assemble and control the high prestressed springs is a definite disadvantage to this system since the spring force must exceed the brake pressure acting on the other side of the piston. In addition, the spring must be dimensioned so that the spring moves through the linear portion of the spring characteristic only to insure that the volume increase in the brake circuit will be analogous to the control signal. Since the pressure relief piston is mechanically coupled to the separating valve, the hydraulic fluid will be sucked from the brake circuit whenever the separating valve is actuated. This will cause an underpressure or vacuum in the brake line when the piston is actuated with little or no brake pressure being applied, such as when the control is being tested without the application of the brake. The vacuum or underpressure which is caused may result in foaming or vaporization of the hydraulic fluid and a complete loss of brake pressure. Another disadvantage is that the high spring pressure will cause a pressure peak in the brake circuit when the piston is returned to its initial position after a control cycle. In addition to this, operation of the control is noisy and the high forces involved cause premature wearing of the parts.

SUMMARY OF THE INVENTION

It is an object of the present invention to provide an antiskid brake control system in which the separating valve and the pressure relief piston are mechanically separated and may be actuated independently and successively.

It is a further object of this invention to eliminate the necessity for a high preload spring used in prior systems.

This invention achieves these objects by providing an antiskid brake control system having a hydraulically interconnected separating valve and a pressure relief piston to effect an increase in the volume of the brake line connected to the wheel. The pressure relief piston moves independently of the separating valve and is actuated by the application of a controlled pressure differential applied across the actuating surfaces of the piston.

In particular the actuating piston surfaces of the separating valve and the pressure relief piston can alternately be connected to either a hydraulic pressure source or reservoir via a pair of two-way valves. The other end of the pressure relief cylinder communicates with the brake line which is isolated by the action of the separating valve.

The two-way valves are similar solenoid valves having double-acting cone surfaces which connect a central annular port to one of two axially spaced ports. The edges of the central annular port provide the seat for the symmetrical conical surfaces.

The actuating chamber for the separating valve is connected to one port in each valve. The other port in each valve is separately connected to the actuating chamber of the pressure relief cylinder by means of hydraulic lines. The central annular port of one valve is connected to the hydraulic pressure source which may be an accumulator while the other is connected to the system reservoir.

In the rest or neutral position of the system the spring loaded solenoid valves connect the pressure source to the actuating chamber of the pressure relief cylinder and the reservoir to the actuating chamber of the separating valve. The separating valve is spring loaded to the opened position in the neutral condition while the pressure acting on the surface of the pressure relief piston prevents any volume increase in the brake line.

A check valve is fitted in the conduit between one of the two-way valves and the actuating chamber of the pressure relief piston to prevent fluid from flowing back toward the pressure source.

A locking device is provided for preventing actuation of the pressure relief piston if the pressure supplying is lost. A spring loaded push rod designed to counteract the actuating force of the solenoid valve is held away from the two-way valve during normal conditions by means of a pressure chamber and piston surface attached to the push road, the pressure chamber being connected to the pressure source. When the pressure source fails, the push road, which passes through a connecting bore in the cylinder chamber in one of the two-way valves, will move to insure that the valve is in a position in which the fluid cannot drain out of the actuating chamber of the pressure relief cylinder when the pressure supply is lost.

DESCRIPTION OF THE PREFERRED EMBODIMENTS

Figure 1:
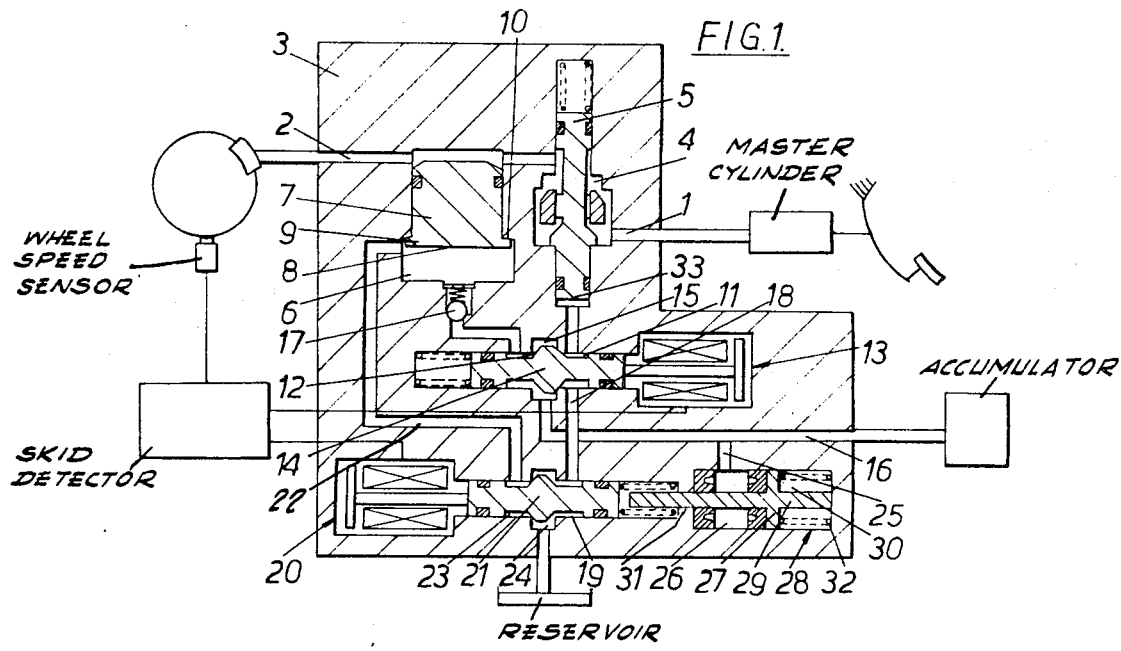
FIG. 1 is a cross section of an antiskid control system embodying the present invention with the system being in the relaxed or deactivated condition.
Figure 2:
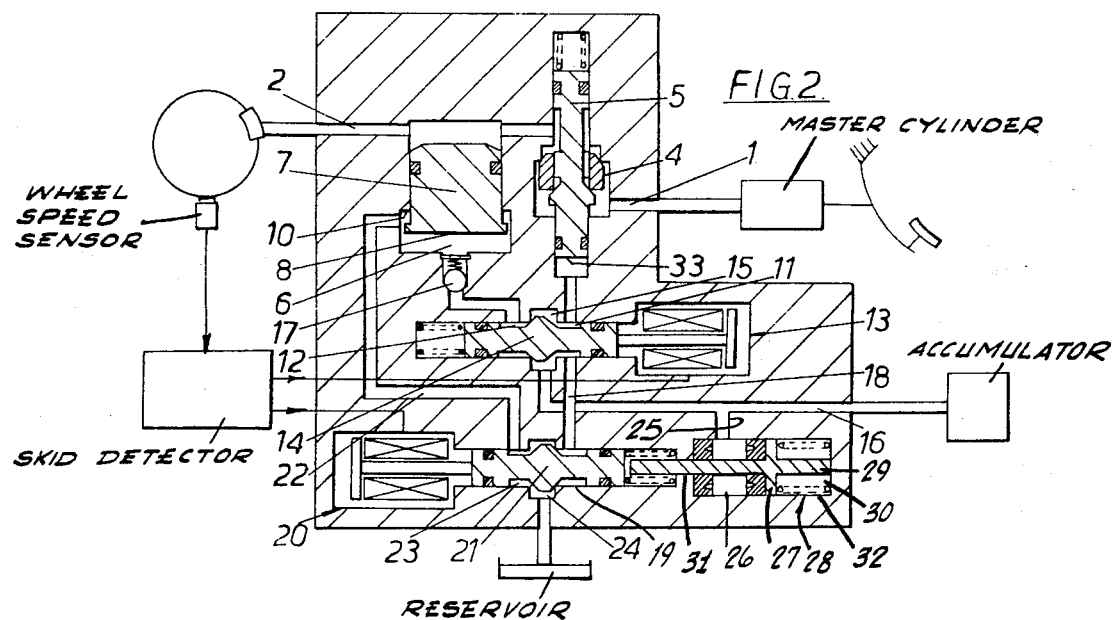
FIG. 2 is similar to FIG. 1 showing the system actuated during the antiskid cycle.
Figure 3:
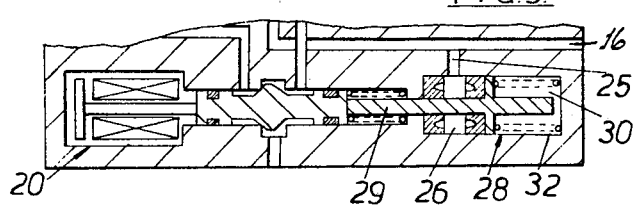
FIG. 3 is a partial sectional view showing the safety mechanism in the actuated condition.

Referring to FIG. 1 there is shown a housing 3 in which pressure medium channels 1, from the master cylinder, and 2, to the wheel cylinder, are connected with one another by a wider, stepped cylinder bore 4 in which a pressure medium operated separating valve 5 is arranged and combined with a check valve. A cylinder bore 6 is positioned in the pressure medium channel 2 leading to the wheel cylinder. A pressure relief piston 7 is arranged to slide in the bore 6 and is sealed against the cylinder wall. In rest position the pressure relief piston 7 lies with its flange 9 on a shoulder 10 in the cylinder bore 6. The chambers of the cylinder bores 4 and 6 which are limited in one direction by the actuating surface 33 of the separating valve 5 and of the pressure relief piston 7 are connected with one of the sections 11, 12 of the cylinder bore by means of a pressure medium line. The sections are separated from each other by the valve body of a two-way valve 13 which is electro-magnetically operated and designed as a double-acting cone valve. The sections 11, 12 of the cylinder bore which have to be separated from one another are formed by a recess in the surface of the valve body. In the center the latter provides a valve closing member 14 which is conical on each side. The seat for both valve cones is formed by the edges of an annular groove 15 on the inner circumference of the cylinder bore. The annular groove 15 communicates either with the section 11 or with the section 12 of the cylinder bore depending on the position of the valve body. From the annular groove 15 a pressure medium line 16 leads directly to the hydraulic energy source, e.g., an accumulator. A check valve 17 which opens in direction of the cylinder chamber 6 is arranged in the pressure medium line from the cylinder chamber 6 of the pressure relief piston 7 to the section 12 of the cylinder bore of the two-way valve 13. A pressure medium line 18 connects the section 11 of the cylinder chamber of the valve 13 which communicates with the cylinder chamber containing the actuating surface 33 of the separating valve 5, with the section 19 of the cylinder chamber of a second solenoid two-way valve 20 designed in the same way as 13. A pressure medium line 22 from the cylinder chamber 6 of the pressure relief piston 7 leads into the section 23 of the cylinder chamber which is separated from the section 19 by the valve closing member 21 of the valve 20 which is conical on both sides. From the annular groove 24 whose edges form the valve seat for both the conical surfaces of the valve closing member 21 a pressure medium line branches off and leads directly to the reservoir. Depending on the position of the valve body the space of the annular groove 24 communicates with one of the sections 19 or 23 of the cylinder chamber of the two-way valve 20.

In order to keep the brake system operative when the pressure supply from the accumulator is lost an automatic locking device is provided which holds the solenoid two-way valve 20 in initial position when the accumulator pressure fails. The control is then bypassed and normal braking is possible.

From the pressure medium channel 16 which is directly connected with the accumulator a connection 25 leads into a chamber 26 which is formed by a cylindrical recess 28 in the housing 3 and separated into two parts by a partition 27 arranged on a rod 29. On one side of the partition 27 the rod 29 rests on the bottom of the second closed chamber 30 of the cylindrical recess 28 and with the other end it passes through the chamber 26, connected with the accumulator, and from there it projects through a connecting bore 31 into the part of the cylinder chamber of the valve 20 which controls the connection to the reservoir. In said part a spring is arranged which overcomes the frictional force of the sealings of the valve body. Between the opposite surfaces of the rod 29 and the valve body a gap is formed in normal position and insures a reliable opening and closing of the two-way valve 20. The chamber 26 which is connected with the accumulator is sealed against the passage 31 at the bottom and at the partition 27 by sealing sleeves to prevent the accumulator pressure from penetrating into the second chamber 30 or the cylinder chamber of the two-way valve 20.

In initial position the pressure of the accumulator in chamber 26 presses the partition 27 with the rod 29 against a spring 32 arranged in the chamber 30. Said spring is propped between the partition 27 and the cylinder bottom.

OPERATION

In the rest position the master cylinder is directly connected with the wheel cylinder by the open separating valve 5. The pressure relief piston 7 rests with the flange 9 on the shoulder 10 of its cylinder chamber 6 because its actuating surface 8 is under pressure from the accumulator. This pressure comes into the cylinder chamber 6 through the line 16 and the solenoid valve 13 via a check valve 17. In the rest position the solenoid valve 13 connects the annular groove 15 where the line 16 from the accumulator ends with the section 12 of the cylinder chamber of the valve 13 from which a connection is provided to the cylinder chamber 6. The chamber of the cylinder bore 4 of the separating valve 5 containing the actuating surfaces 33 of the pressure medium operated valve body communicates with the reservoir through pressure medium lines and through the sections 11, 19 of the solenoid valves 13, 20, the sections being separated from the accumulator pressure. The section 23 of the cylinder chamber of the valve 20 is connected via the pressure medium line 22 with the cylinder chamber 6 of the pressure relief piston 7, the chamber being under pressure from the accumlator, and is separated in rest position of the valve 20 by a valve closing member 21 from the annular groove 24 which communicates with the reservoir.

Therefore in the rest position of the system, brake pressure can be built up in the wheel cylinder from the master cylinder. When the danger of skidding arises the wheel sensor generates a signal which is strong enough to start the control cycle. The windings of the two solenoid valves 13, 20 are supplied with current and both move into their actuated positions. The annular groove 15 of the valve 13 controlling the accumulator pressure is connected with the section 11 of the valve space from which a pressure medium line leads to the actuating surface 33 of the separating valve 5. The cylinder chamber 6 of the pressure relief piston 7 is separated from the accumlator by the valve cone 14. At the same time the cylinder chamber 6 is connected with the return by a switch-over of the solenoid valve 20 controlling the reservoir via the pressure medium channel 22, the section 23 of the valve chamber communicating with the annular groove 24 while the cylinder chamber of the separating valve 5 is separated from the reservoir by the valve closing member 21.

The separating valve 5 is closed under the accumulator pressure applied to the actuating surface 33 of the valve body so that wheel cylinder and master cylinder are separated from one another. The pressure medium in the cylinder chamber 6 of the pressure relief piston 7 expands into the reservoir and the pressure relief piston 7 moves into the cylinder chamber 6, under the influence of the brake pressure in section 2 of the brake line connected with the wheel cylinder. In this way the volume of the pressure medium line 2 increases so that the brake pressure is reduced and the respective wheel is reaccelerated to overcome the critical deceleration range. When the signal of the sensor disappears the exciting current of the solenoid valves 13, 20 is interrupted and both are returned to their initial position by the force of the return spring. In this way the cylinder chamber 6 of the pressure relief piston 7 is again connected to the accumulator and separated from the reservoir, so that the pressure relief piston 7 returns to its initial position and the original brake pressure is built up again. The pressure exerted on the front face (actuating surface) 33 of the valve body of the separating valve 5 expands into the reservoir so that the separating valve 5 combined with a check valve is opened by the force of the return spring and the connection between the master cylinder and the wheel cylinder is restored. A new braking process and a new control cycle can be started.

In order to insure a reliable operation of the brake system even when the pressure from the accumulator fails the above mentioned locking device is installed. When the accumulator pressure fails the pressure in the cylinder chamber 6 has to be maintained in order to avoid an increase of volume of the brake circuit by the movement of the pressure relief piston 7. This is partly effected by the check valve 17 which is arranged in the line from the cylinder chamber 6 to the valve 13 controlling the accumulator pressure and partly by keeping the valve 20 which controls the return in the initial position by the locking device so that the pressure medium cannot flow from the cylinder chamber 6 through the pressure medium line 22 to the reservoir. When the accumulator pressure fails the pressure in the chamber 26, connected with the accumulator, drops and the prestressed spring 32 moves the partition 27 with the rod 29 so that the volume of the chamber 26 is reduced and the part of the rod 29 projecting into the cylinder chamber of the solenoid valve comes to lie against the front face of the valve body and thus keeps the valve 20 in its initial position even when the sensor of the control system gives off a signal which would initiate a control cycle. The force of the spring 32 has to be larger than the electromagnetic force which may originate from the exciting winding of the valve 20. When the accumulator pressure returns the locking device automatically returns to its rest position.

A special advantage of this invention is that a strongly prestressed spring for the constructional unit effecting the volume increase in the brake circuit can be avoided.

Due to the mechanical separation of the separating valve and the pressure relief piston the volume increase is always comparable with the control signal so that no underpressure or vacuum will result in the brake line. This prevents foaming and the consequent loss of brake pressure. Compared to known antiskid control devices the device according to the invention is essentially smaller.

While I have described above the principles of my invention in connection with specific apparatus it is to be clearly understood that this description is made only by way of example and not as a limitation to the scope of my invention as set forth in the accompanying claims.

I claim:

1. An antiskid brake control system in which the hydraulic connection between the wheel cylinder and the master cylinder is interrupted by a separating valve in response to a brake release signal generated by an antiskid sensor system and in which the hydraulic brake fluid can expand into a chamber connected to the wheel cylinder by a volume increase upon a controlled movement of a pressure relief piston, the system being characterized in that upon a response of the separating valve interrupting the brake line the movement of the pressure relief piston causing the volume increase is effected independently from the separating valve and both directions of movement by a controlled difference of hydraulic pressure applied to the actuating surfaces of the pressure relief piston;

the part of the respective cylinder chambers containing the actuating surface of the separating valve and the actuating surface of the pressure relief piston can alternatively be connected to a hydraulic pressure source and to a reservoir by a pair of two-way valves, the cylinder bore for the separating piston communicating with the portion of the brake line connected with the wheel cylinders and the separating piston being guided in its cylinder bore in a sealing manner;

said two-way valves being electromagnetically operated double-acting cone valves each having a valve chamber divided into three sections by recesses in the valve body and by an annular groove in the center of the cylinder bore of the respective two-way valve; the sections of the respective valve chamber being formed by the recesses are separated by a valve closing member centrally guided on the valve body and have a conical shape on each side; the edges of the annular groove form the seat for the valve closing member and the annular groove communicates with either one or the other section depending on the position of the valve body.

2. An antiskid brake control system as defined in claim 1, characterized in that the sections of the valve chambers of the two-way valves communicate with each other and with the cylinder chamber containing the actuating surface of the separating valve by means of hydraulic conduits and that the sections of the valve chambers of the two valves are each separately connected with the cylinder chamber of the pressure relief piston by means of hydraulic conduits and that the annular groove of the valve communicates with a hydraulic pressure source, and the annular groove of the valve with the reservoir.

3. An antiskid brake control system as defined in claim 2, characterized in that in rest position of the system the section of the valve connected with the cylinder chamber of the pressure relief piston communicates with its annular groove and the section of the valve connected with the cylinder chamber of the separating valve communicates with its annular groove so that the cylinder chamber of the pressure relief piston is in communication with the hydraulic pressure source and the cylinder chamber of the separating valve communicates with the reservoir.

4. An antiskid brake control system as defined in claim 3, characterized in that a check valve opening towards the cylinder chamber is arranged in the hydraulic conduit from section of the valve to the cylinder chamber of the separating piston.

5. An antiskid brake control system as defined in claim 4, characterized in that a cylindrical recess is divided into two parts by a partition worked onto a pin, the pin projecting through a connecting bore into the cylinder chamber of the valve controlling the return and keeping the partition in initial position against a prestressed spring by a pressure from the accumulator conveyed into the chamber facing the valve so that a gap between the opposite surfaces of the pin and the valve body of the valve remains open and ensures a reliable opening and closing of the valve.

6. An antiskid brake control system comprising:

skid sensing means for generating an electrical skid signal in response to an incipient skid condition of a vehicle wheel;

a master cylinder;

a brake for at least one wheel;

a first pressure medium line connected between said master cylinder and said brake;

a separating valve connected in said first pressure medium line; said separating valve having a first pressure medium actuating surface, a normally open position to connect said master cylinder to said brake and an actuated closed position to disconnect said master cylinder from said brake;

a first hollow cylinder connected in said first pressure medium line independent of said separating valve;

a pressure relief piston slidably sealed in said first hollow cylinder, said piston having a second pressure medium actuating surface, a first position to provide a desired volume in said first pressure medium line and a second position to increase the volume of said first pressure medium line;

a pressure medium accumulator;

a pressure medium reservoir;

a second pressure medium line connected to said accumulator;

a first two-way solenoid valve connected to said second pressure medium line, said first valve having an unactuated position to apply pressure medium from said accumulator to said second actuating surface to place said piston in said first position and an actuated position to connect the pressure medium from said accumulator to said first actuating surface to place said separating valve in said actuated closed position; and a second two-way solenoid valve having a first input port connected to said first hollow cylinder adjacent said second actuating surface, a second input port connected to said separating valve adjacent said first actuating surface and a single output port connected to said reservoir, said second solenoid valve having an unactuated position to connect said second input port to said output port and an actuated position to connect said first input port to said output port;

said first and second solenoid valve being coupled in common to said skid sensing means and actuated simultaneously by said electrical skid signal.

7. A system according to claim 6, further including an arrangement connected to said accumulator to permit normal operation of said second solenoid valve when said accumulator is operating normally, but to prevent said second solenoid valve from achieving said actuated position in the presence of said electrical skid signal if said accumulator fails thereby enabling normal braking operation.

8. A system according to claim 6, wherein each of said first and second solenoid valves include a second hollow cylinder having an annular radially extending portion, and a piston slidably sealed to the inner surface of said second hollow cylinder including a double conical valve member disposed for movement within said annular radially extending portion, the inner edges of said annular radially extending portion providing valve seats for said conical valve members; and further including a rod disposed coaxially of said second hollow cylinder of said second solenoid valve, one end of said rod being in spaced relation with an adjacent end of said piston of said second solenoid valve, a spring urging said rod toward said piston of said second solenoid valve, and an arrangement associated with said rod within said second hollow cylinder of said second solenoid valve, said arrangement being connected to said accumulator to overcome the urging of said spring when said accumulator is operative, but which will enable said rod to engage the adjacent end of said piston of said second solenoid valve to prevent said second solenoid valve from achieving said actuated position in the presence of said electrical skid signal if said accumulator fails thereby enabling normal braking operation.

* * * * *